(12) United States Patent
Taylor et al.

(10) Patent No.: US 9,411,813 B2
(45) Date of Patent: Aug. 9, 2016

(54) LARGE TREE VIEW NAVIGATION

(75) Inventors: Grant D. Taylor, Richmond Hill (CA); Robert C. Ma, Markham (CA)

(73) Assignee: International Business Machines Corporation, Armonk, NY (US)

( * ) Notice: Subject to any disclaimer, the term of this patent is extended or adjusted under 35 U.S.C. 154(b) by 2653 days.

(21) Appl. No.: 11/961,352

(22) Filed: Dec. 20, 2007

(65) Prior Publication Data

US 2009/0164947 A1    Jun. 25, 2009

(51) Int. Cl.
*G06F 3/048* (2013.01)
*G06F 17/30* (2006.01)

(52) U.S. Cl.
CPC .... *G06F 17/30126* (2013.01); *G06F 17/30572* (2013.01)

(58) Field of Classification Search
USPC .................................. 715/853; 707/999.201
See application file for complete search history.

(56) References Cited

U.S. PATENT DOCUMENTS

2002/0073108 A1* 6/2002 Morita et al. ................. 707/201
2007/0156677 A1* 7/2007 Szabo .............................. 707/5

* cited by examiner

*Primary Examiner* — Matthew Ell
(74) *Attorney, Agent, or Firm* — Steven M. Greenberg, Esq.; CRGO Law

(57) ABSTRACT

Embodiments of the present invention address deficiencies of the art in respect to tree representations of object hierarchies and provide a method, system and computer program product for large tree view navigation. In an embodiment of the invention, a tree view navigation method can be provided. The method can include selecting a node in a tree view of an object hierarchy, specifying filter text in a filter control for the selected node, and filtering a branch of nodes extending from the selected node to include only nodes including the filter text. In this way, despite a voluminous number of nodes in the branch, relevant nodes can be located flexibly and efficiently.

15 Claims, 1 Drawing Sheet

LARGE TREE VIEW NAVIGATION

BACKGROUND OF THE INVENTION

1. Field of the Invention

The present invention relates to the display of objects such as files and containers in a hierarchy 2. Description of the Related Art Electronic objects in a data processing system often are organized hierarchically in a parent-child relationship. Specifically, the earliest file systems for computing environments provided a hierarchical directory structure in which electronically stored documents could be stored in specific directories or folders. Directories and folders, collectively viewed as containers, could be nested to provide a level of organization for electronic documents akin to a tree having a root node, leaf nodes and intermediate branches and connecting nodes.

Contemporary data structure theory expands upon the notion of the hierarchical directory structure to provide the most common form of genus-species data organization not only for file storage, but for general objects in memory as well. While hierarchical trees are known to be constructed programmatically in a number of ways, the most common way is the linked list of nodes in a tree formation. Generally, the hierarchical tree can be visually rendered in a GUI by providing collapsible nodes such that the hierarchy can be viewed merely as a root node, or the hierarchy can be viewed in fully expanded form to reveal the hierarchical tree. Of course, as each node in the hierarchy can be expanded or collapsed individually, any portion of the hierarchical tree can be viewed within the GUI as most computing users have become accustomed to understand.

In the most recognizable form of the conventional hierarchical tree file browser, a dual paned approach is provided. The dual paned approach includes a navigation pane and a content pane. In the navigation pane, a visual tree representative of the file hierarchy is rendered with collapsible and expandable nodes throughout. The nodes are limited, however, to containers of the hierarchy and the nodes do not include files. By comparison, in the content pane, the content of a selected node is displayed. The content generally includes both the file content of the container represented by the selected node, and any containers immediately linked in child-relationships to the container represented by the selected node.

Other recognizable forms of the conventional hierarchical tree file browser provide for a multi-paned approach. In the multi-paned approach, the left-most, primary pane includes a tree view of the entire hierarchy. Subsequent panes adjacent to the left-most, primary pane and to the right of the left-most, primary pane provide hierarchical views of the branches represented by selected nodes in the left adjacent panes. The right-most pane ultimately provides a listing of the files in a selected node as well as any containers linked to the selected node in a child relationship.

For relatively flat hierarchical structures, the conventional hierarchical tree view functions admirably after more than two decades of use. Yet, for deep, multi-branch structures, the conventional tree view falls short on functionality. Specifically, in order to readily view and appreciate different objects in an object hierarchy within a conventional hierarchical tree view, the end user must repeatedly select different nodes along a branch while recording the content of each node separately. Recognizing relationships between different objects at different levels of the hierarchy can be near impossible. In fact, to the extent that a voluminous number of nodes appear in any branch of the tree view, scrolling to find a node of relevance can be time consuming and irritating.

BRIEF SUMMARY OF THE INVENTION

Embodiments of the present invention address deficiencies of the art in respect to tree representations of object hierarchies and provide a novel and non-obvious method, system and computer program product for large tree view navigation. In an embodiment of the invention, a tree view navigation method can be provided. The method can include selecting a node in a tree view of an object hierarchy, specifying filter text in a filter control for the selected node, and filtering a branch of nodes extending from the selected node to include only nodes including the filter text. In this way, despite a voluminous number of nodes in the branch, relevant nodes can be located flexibly and efficiently.

In an aspect of the embodiment, the method further can include selecting another node in the tree view of the object hierarchy, specifying favorites as a filter in another filter control for the selected another node, and filtering another branch of nodes extending from the selected another node to include only nodes marked as a favorite. Yet further in another aspect of the embodiment, filtering a branch of nodes extending from the selected node to include only nodes including the filter text can include filtering a branch of nodes extending from the selected node to include only nodes including the filter text and also nodes that while not including the filter text have been marked as a favorite.

Even yet further, in another aspect of the embodiment, the method can include selecting another node in the tree view of the object hierarchy, specifying different filter text in another filter control for the selected another node, and filtering a branch of nodes extending from the selected another node to include only nodes including the different filter text. Finally, in even yet another aspect of the embodiment, the method further can include selecting a show all entry in the branch and displaying all nodes in the branch irrespective of the filter text.

In another embodiment of the invention, a user interface data processing system can be provided. The system can include a display shown in a computer including a tree view of an object hierarchy, such as a file hierarchy or a database hierarchy. The system also can include filter controls, each corresponding to a different node in the tree view. Finally, the system can include tree navigation view logic coupled to the display and executing in the computer. The logic can include program code enabled to filter a branch of nodes extending from a selected node in the tree view to include only nodes including filter text provided in a corresponding one of the filter controls. Additionally, the program code can be further enabled to filter a branch of nodes extending from a selected node in the tree view to include only nodes marked as a favorite.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for large tree view navigation. In accordance with an embodiment of the present invention, a tree view for an object hierarchy such as a file hierarchy or a database hierarchy can be provided. The nodes of the hierarchy from which branches extend can be configured with a filter control. The filter control for a corresponding branch can accept filter text in response to which the child nodes in the corresponding branch can be filtered to result in only a subset of the child nodes including the filter text being visible in the corresponding branch in the tree. Further, the filter control for a corresponding branch can accept a request for favorites in response to which the child nodes in the corresponding branch can be filtered to result in only a subset of the child nodes marked as favorites being visible in the corresponding branch in the tree. In this way, the branches of the tree can be viewed efficiently despite the number of nodes in a given branch.

Figure 1:
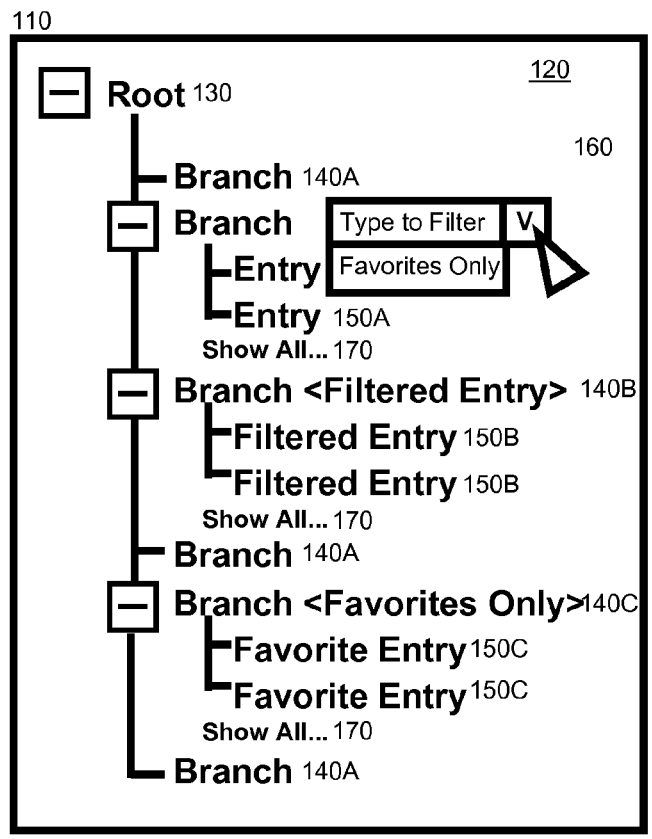
FIG. 1 is a pictorial illustration of a user interface configured for large tree view navigation.

In further illustration, FIG. 1 pictorially depicts a user interface configured for large tree view navigation. As shown in FIG. 1, a user interface 110 can be provided to include a tree view 120 of an object hierarchy. The tree view 120 can include a root node 130 and a multiplicity of branches 140A, 140B, 140C extending therefrom. The branches 140A, 140B, 140C can be expanded to reveal constituent nodes 150A, 150B, 150C or collapsed to obscure the constituent nodes 150A, 150B, 150C. As it will be recognized by the skilled artisan, the branches 140A, 140B, 140C further can include additional branches and so forth in order to form the tree view 120 of the object hierarchy.

Each of the branches 140A, 140B, 140C can be coupled to a filter control 160. The filter control 160 when activated can permit the entry of filter text. In response to the entry of filter text, a filtered branch 140B can be produced to include only nodes 150B including the filter text. Further, the filter control 160 when activated can permit the selection of favorites only. In response to the selection of favorites only, a filtered branch 140C can be produced to include only nodes 150C having previously been marked as a favorite. As another option, when filtering according to filter text, ones of the nodes 150B that had not been included in the filtered branch 140B for failure to include the filter text can be included in the filtered branch 140B even still for having been marked as a favorite. In any event, for each of the filtered branches 140B, 140C, the filter can be removed through the selection of a show all control 170.

Figure 2:
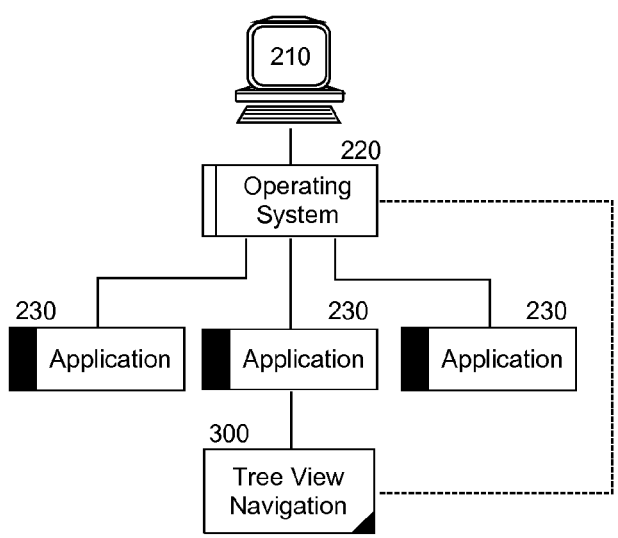
FIG. 2 is a schematic illustration of a data processing system configured for large tree view navigation; and, FIG. 3 is a flow chart illustrating a process for large tree view navigation.

The user interface 110 shown in FIG. 1 can be implemented within a computer data processing system. In further illustration, FIG. 2 schematically depicts a data processing system configured for large tree view navigation. The system can include a host computing platform 210 hosting the operation of an operating system 220. The operating system 220 in turn can manage the execution of multiple different applications 230. At least one of the applications 230 can be configured with tree view navigation logic 300. The logic 300 can include program code to associate a filter control with different nodes in a tree view rendered within the application 230.

In particular, the filter control can be enabled to accept filter text in response to which a corresponding branch of nodes can be filtered according to the filter text. The filter control also can be enabled to accept a selection of favorites only such that the corresponding branch of nodes can be filtered to include only nodes in the corresponding branch having previously been marked as a favorite. Notably, multiple different ones of the branches in a tree view can be filtered differently according to different filter text in order to provide a multi-filter text filtered tree view of an object hierarchy. Further, once a node has been marked as a favorite, the node can appear in a filtered branch according to filter text even if the node itself does not include the filter text.

Figure 3:
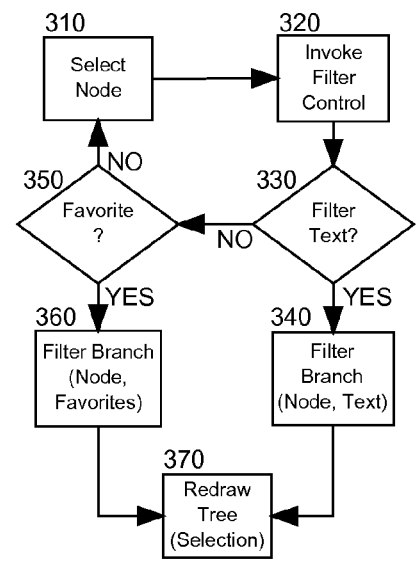

In yet further illustration of the operation of the tree navigation view logic 300, FIG. 3 is a flow chart illustrating a process for large tree view navigation. Beginning in block 310, node can be selected in a tree view of an object hierarchy. In block 320 a filter control can be invoked. In decision block 330, it can be determined whether or not filter text has been provided in the filter control. If so, in block 340 the nodes in the branch extending from the selected node can be filtered so that only nodes including the filter text will be displayed in the branch. If not, in decision block 350 it can be determined whether or not favorites have been specified in the filter control. If so, in block 360 only those nodes in the branch that have been marked a favorite will be displayed. Finally, in block 370 the tree view can be re-rendered.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A tree view navigation method comprising:
rendering a tree view of an object hierarchy in a graphical user interface by a processor of a computer, the tree view comprising a plurality of branches each of the branches including one or more nodes;
receiving a selection in the graphical user interface of one of the nodes and in response thereto, displaying a user interface filter control in which filter text is received;
specifying filter text in the filter control for the selected node;
filtering a branch of nodes extending from the selected node to include only nodes that include the filter text; and,
re-rendering at least a portion of the tree view to reflect the filtering of the branch of nodes that extend from the selected node so that only nodes that include the filter text are displayed for the branch of nodes.

2. The method of claim 1, further comprising:
selecting another node in the tree view of the object hierarchy;
specifying favorites as a filter in another filter control for the selected another node; and
filtering another branch of nodes extending from the selected another node to include only nodes marked as a favorite.

3. The method of claim 1, wherein
the filtering the branch also includes nodes that, while not including the filter text, have been marked as a favorite.

4. The method of claim 1, further comprising:
selecting another node in the tree view of the object hierarchy;
specifying different filter text in another filter control for the selected another node; and
filtering a branch of nodes extending from the selected another node to include only nodes including the different filter text.

5. The method of claim 1, further comprising:
selecting a show all entry in the branch; and
displaying all nodes in the branch irrespective of the filter text.

6. A user interface data processing system comprising:
a processor of a computer;
a display shown in a computer comprising a tree view of an object hierarchy in a graphical user interface by the processor of the computer, the tree view comprising a plurality of branches each of the branches including one or more nodes;
a plurality of filter controls, each corresponding to a different node in the tree view; and
a tree navigation view processor coupled to the display and executing in the computer, the processor configured to receive a selection in the graphical user interface of one of the nodes and in response thereto, displaying a user interface filter control in which filter text is received, specifying filter text in the filter control for the selected node, filter a branch of nodes extending from a selected node in the tree view to include only nodes including filter text provided in a corresponding one of the filter controls, and
re-render at least a portion of the tree view to reflect the filtering of the branch of nodes that extend from the selected node so that only nodes that include the filter text are displayed for the branch of nodes.

7. The system of claim 6, wherein
the processor is further configured to filter the branch of nodes extending from the selected node in the tree view to include only nodes marked as a favorite.

8. The system of claim 6, wherein
the processor is further configured filter the branch of nodes extending from the selected node to also include nodes that, while not including the filter text, have been marked as a favorite.

9. The system of claim 6, wherein
the object hierarchy is a file system hierarchy.

10. The system of claim 6, wherein
the object hierarchy is a database hierarchy.

11. A computer program product comprising a non-transitory computer usable storage medium having stored therein computer usable program code for tree view navigation, the computer usable program code, which when executed by a computer hardware system, causes the computer hardware system to perform
rendering a tree view of an object hierarchy in a graphical user interface by a processor of a computer, the tree view comprising a plurality of branches each of the branches including one or more nodes;
receiving a selection in the graphical user interface of one of the nodes and in response thereto, displaying a user interface filter control in which filter text is received;
specifying filter text in the filter control for the selected node;
filtering a branch of nodes extending from the selected node to include only nodes that include the filter text; and,
re-rendering at least a portion of the tree view to reflect the filtering of the branch of nodes that extend from the selected node so that only nodes that include the filter text are displayed for the branch of nodes.

12. The computer program product of claim 11, wherein the computer usable program code further causes the computer hardware system to perform:
selecting another node in the tree view of the object hierarchy;
specifying favorites as a filter in another filter control for the selected another node; and
filtering another branch of nodes extending from the selected another node to include only nodes marked as a favorite.

13. The computer program product of claim 11, wherein
the filtering the branch also includes nodes that, while not including the filter text, have been marked as a favorite.

14. The computer program product of claim 11, wherein the computer usable program code further causes the computer hardware system to perform:
selecting another node in the tree view of the object hierarchy;
specifying different filter text in another filter control for the selected another node; and
filtering a branch of nodes extending from the selected another node to include only nodes including the different filter text.

15. The computer program product of claim 11, wherein the computer usable program code further causes the computer hardware system to perform:
selecting a show all entry in the branch; and displaying all nodes in the branch irrespective of the filter text.

* * * * *